United States Patent
Katic

(10) Patent No.: US 9,703,870 B2
(45) Date of Patent: Jul. 11, 2017

(54) SOCIAL-BASED OPTIMIZATION OF WEB CRAWLING FOR ONLINE SOCIAL NETWORKS

(71) Applicant: Facebook, Inc., Menlo Park, CA (US)

(72) Inventor: Vojin Katic, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 357 days.

(21) Appl. No.: 14/533,229

(22) Filed: Nov. 5, 2014

(65) Prior Publication Data

US 2016/0125082 A1    May 5, 2016

(51) Int. Cl.
G06F 17/30    (2006.01)
G06Q 50/00    (2012.01)

(52) U.S. Cl.
CPC ....... G06F 17/30864 (2013.01); G06Q 50/01 (2013.01)

(58) Field of Classification Search
CPC ................................................ G06F 17/30864
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,539,697 B1 | 5/2009 | Akella |
| 7,752,326 B2 | 7/2010 | Smit |
| 7,836,044 B2 | 11/2010 | Kamvar |
| 8,027,990 B1 | 9/2011 | Mysen |
| 8,060,639 B2 | 11/2011 | Smit |
| 8,112,529 B2 | 2/2012 | Van Den Oord |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |

(Continued)

*Primary Examiner* — Khanh Pham
(74) *Attorney, Agent, or Firm* — Baker Botts L.L.P.

(57) ABSTRACT

In one embodiment, a method includes a search engine of an online social network crawling a first webpage of a first web domain, where the first webpage includes links to one or more second webpages, each of which may be within a second web domain, accessing a domain ranking for each second web domain, where for each second web domain the domain ranking may be based on one or more domain-quality signals associated with the second web domain, where the domain-quality signals may include a measure of activations of social plug-ins of the online social network associated with webpages of the second web domain, selecting one or more of the second webpages to crawl based at least in part on the domain ranking of the second web domain associated with the second webpage, and the search engine of the online social network crawling each selected second webpage.

20 Claims, 7 Drawing Sheets

(56) References Cited

U.S. PATENT DOCUMENTS

| | | | |
|---|---|---|---|
| 8,572,129 B1 | 10/2013 | Lee | |
| 8,595,297 B2 | 11/2013 | Marcucci | |
| 8,601,027 B2 | 12/2013 | Behforooz | |
| 8,732,208 B2 | 5/2014 | Lee | |
| 8,751,521 B2 | 6/2014 | Lee | |
| 8,782,080 B2 | 7/2014 | Lee | |
| 8,868,603 B2 | 10/2014 | Lee | |
| 2002/0086676 A1 | 7/2002 | Hendrey | |
| 2002/0196273 A1 | 12/2002 | Krause | |
| 2003/0154194 A1 | 8/2003 | Jonas | |
| 2003/0208474 A1 | 11/2003 | Soulanille | |
| 2004/0088325 A1 | 5/2004 | Elder | |
| 2004/0172237 A1 | 9/2004 | Saldanha | |
| 2004/0215793 A1 | 10/2004 | Ryan | |
| 2004/0255237 A1 | 12/2004 | Tong | |
| 2005/0091202 A1 | 4/2005 | Thomas | |
| 2005/0125408 A1 | 6/2005 | Somaroo | |
| 2005/0131872 A1 | 6/2005 | Calbucci | |
| 2005/0171955 A1 | 8/2005 | Hull | |
| 2005/0256756 A1 | 11/2005 | Lam | |
| 2006/0136419 A1 | 6/2006 | Brydon | |
| 2006/0190436 A1 | 8/2006 | Richardson | |
| 2007/0277100 A1 | 11/2007 | Sheha | |
| 2008/0033926 A1 | 2/2008 | Matthews | |
| 2008/0072180 A1 | 3/2008 | Chevalier | |
| 2008/0086467 A1* | 4/2008 | Crumb | G06F 17/30864 707/999.005 |
| 2008/0104113 A1* | 5/2008 | Wong | G06F 17/30867 707/999.107 |
| 2008/0183694 A1 | 7/2008 | Cane | |
| 2008/0183695 A1 | 7/2008 | Jadhav | |
| 2008/0270615 A1 | 10/2008 | Centola | |
| 2009/0006543 A1 | 1/2009 | Smit | |
| 2009/0094200 A1 | 4/2009 | Baeza-Yates | |
| 2009/0164929 A1 | 6/2009 | Chen | |
| 2009/0197681 A1 | 8/2009 | Krishnamoorthy | |
| 2009/0228296 A1 | 9/2009 | Ismalon | |
| 2009/0265326 A1 | 10/2009 | Lehrman | |
| 2009/0281988 A1 | 11/2009 | Yoo | |
| 2009/0299963 A1 | 12/2009 | Pippuri | |
| 2010/0049802 A1 | 2/2010 | Raman | |
| 2010/0057723 A1 | 3/2010 | Rajaram | |
| 2010/0179929 A1 | 7/2010 | Yin | |
| 2010/0228744 A1 | 9/2010 | Craswell | |
| 2010/0235354 A1 | 9/2010 | Gargaro | |
| 2011/0022602 A1 | 1/2011 | Luo | |
| 2011/0078166 A1 | 3/2011 | Oliver | |
| 2011/0087534 A1 | 4/2011 | Strebinger | |
| 2011/0137902 A1 | 6/2011 | Wable | |
| 2011/0191371 A1 | 8/2011 | Elliott | |
| 2011/0196855 A1 | 8/2011 | Wable | |
| 2011/0276396 A1 | 11/2011 | Rathod | |
| 2011/0313992 A1 | 12/2011 | Groeneveld | |
| 2012/0059708 A1 | 3/2012 | Galas | |
| 2012/0136852 A1 | 5/2012 | Geller | |
| 2012/0166432 A1 | 6/2012 | Tseng | |
| 2012/0166433 A1 | 6/2012 | Tseng | |
| 2012/0179637 A1 | 7/2012 | Juan | |
| 2012/0185486 A1 | 7/2012 | Voigt | |
| 2012/0221581 A1 | 8/2012 | Narayanan | |
| 2012/0233181 A1* | 9/2012 | Shehata | G06F 17/30864 707/748 |
| 2012/0271831 A1 | 10/2012 | Narayanan | |
| 2012/0278127 A1 | 11/2012 | Kirakosyan | |
| 2012/0284329 A1 | 11/2012 | Van Den Oord | |
| 2012/0311034 A1 | 12/2012 | Goldband | |
| 2013/0031106 A1 | 1/2013 | Schechter | |
| 2013/0041876 A1 | 2/2013 | Dow | |
| 2013/0066876 A1 | 3/2013 | Raskino | |
| 2013/0086057 A1 | 4/2013 | Harrington | |
| 2013/0124538 A1 | 5/2013 | Lee | |
| 2013/0124542 A1 | 5/2013 | Lee | |
| 2013/0144899 A1 | 6/2013 | Lee | |
| 2013/0191372 A1 | 7/2013 | Lee | |
| 2013/0191416 A1 | 7/2013 | Lee | |
| 2013/0226918 A1 | 8/2013 | Berkhim | |
| 2013/0246404 A1 | 9/2013 | Annau | |
| 2014/0258261 A1* | 9/2014 | Singh | G06F 17/30887 707/709 |
| 2015/0310018 A1* | 10/2015 | Fan | G06F 17/30 707/734 |

* cited by examiner

| | Signal_1 | Signal_2 | ... | Signal_k | Ranking |
|---|---|---|---|---|---|
| Page_1 | $value_1(1)$ | $value_1(2)$ | ... | $value_1(k)$ | $Page\_ranking_1$ |
| Page_2 | $value_2(1)$ | $value_2(2)$ | ... | $value_2(k)$ | $Page\_ranking_2$ |
| Page_3 | $value_3(1)$ | $value_3(2)$ | ... | $value_3(k)$ | $Page\_ranking_3$ |
| ... | | | | | |
| Page_N | $value_N(1)$ | $value_N(2)$ | ... | $value_N(k)$ | $Page\_ranking_N$ |

| | Signal_1 | Signal_2 | ... | Signal_k | Ranking |
|---|---|---|---|---|---|
| Domain_1 | $value_1(1)$ | $value_1(2)$ | ... | $value_1(k)$ | $Domain\_ranking_1$ |
| Domain_2 | $value_2(1)$ | $value_2(2)$ | ... | $value_2(k)$ | $Domain\_ranking_2$ |
| Domain_3 | $value_3(1)$ | $value_3(2)$ | ... | $value_3(k)$ | $Domain\_ranking_3$ |
| ... | ... | ... | ... | ... | ... |
| Domain_M | $value_M(1)$ | $value_M(2)$ | ... | $value_M(k)$ | $Domain\_ranking_M$ |

SOCIAL-BASED OPTIMIZATION OF WEB CRAWLING FOR ONLINE SOCIAL NETWORKS

TECHNICAL FIELD

This disclosure generally relates to search-engine web crawling in association with online social networks.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual users within the networks, and edges represent the relationships between the users. The resulting graph-based structures are often very complex. In its simplest form, a social graph is a map of all of the relevant edges between all the nodes being studied.

SUMMARY OF PARTICULAR EMBODIMENTS

In particular embodiments, search-engine web crawling may be optimized by ranking web domains based at least on a variety of domain-quality signals. In particular embodiments, the domain-quality signals may be unique to a social-networking system. In particular embodiments, the social-networking system may determine whether a search engine associated with the social-networking system may crawl one or more webpages within a web domain based at least on one or more domain-quality signals associated with the web domain and collected by the social-networking system. As an example and not by way of limitation, one or more of the domain-quality signals may indicate whether the web domain includes content that is reliable, fresh, and/or appealing to users of the online social network.

In particular embodiments, the domain-quality signals may be used to calculate domain rankings for web domains. The domain-rankings may be used to identify low-quality web domains. In particular embodiments, the search engine may de-prioritize webpages within the low-quality web domains for web crawling. In contrast, the domain-rankings may also be used to identify high-quality web domains. In particular embodiments, the search engine may prioritize webpages within the high-quality web domains for crawling and indexing. In particular embodiments, domain rankings may be calculated for one or more web domains comprising domains, sub-domains, or directories within these. In particular embodiments, the search engine may focus its time and resources on crawling through webpages within high-quality web domains for content to be retrieved in search results.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4A illustrates an example historical ranking data for web crawling of FIG. 3.

FIG. 4B illustrates an example domain ranking table for web crawling of FIG. 3.

DESCRIPTION OF EXAMPLE EMBODIMENTS

System Overview

Figure 1:
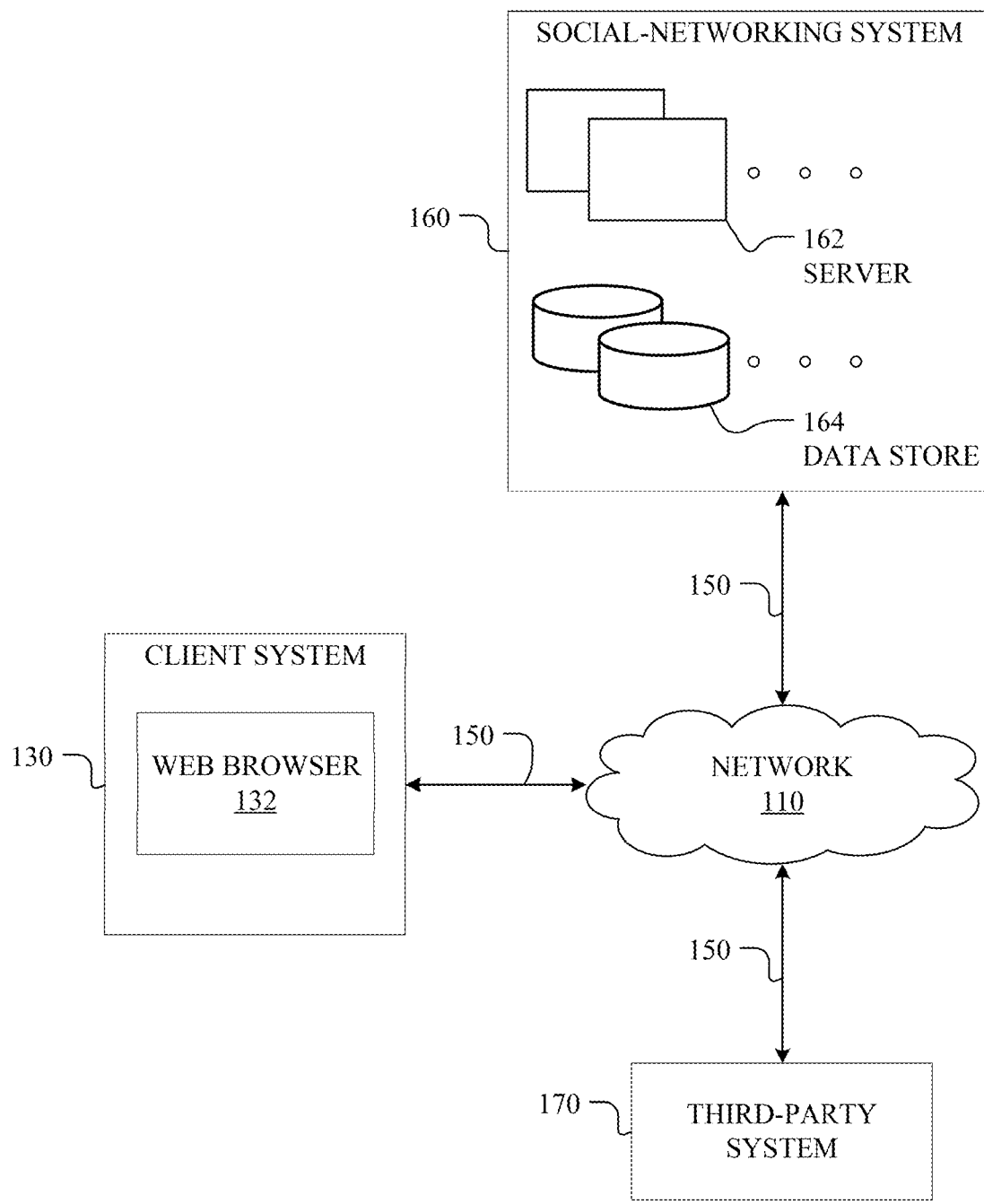
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable page files, including webpages or pages presented as a user interface of a native application. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

Social Graphs

Figure 2:
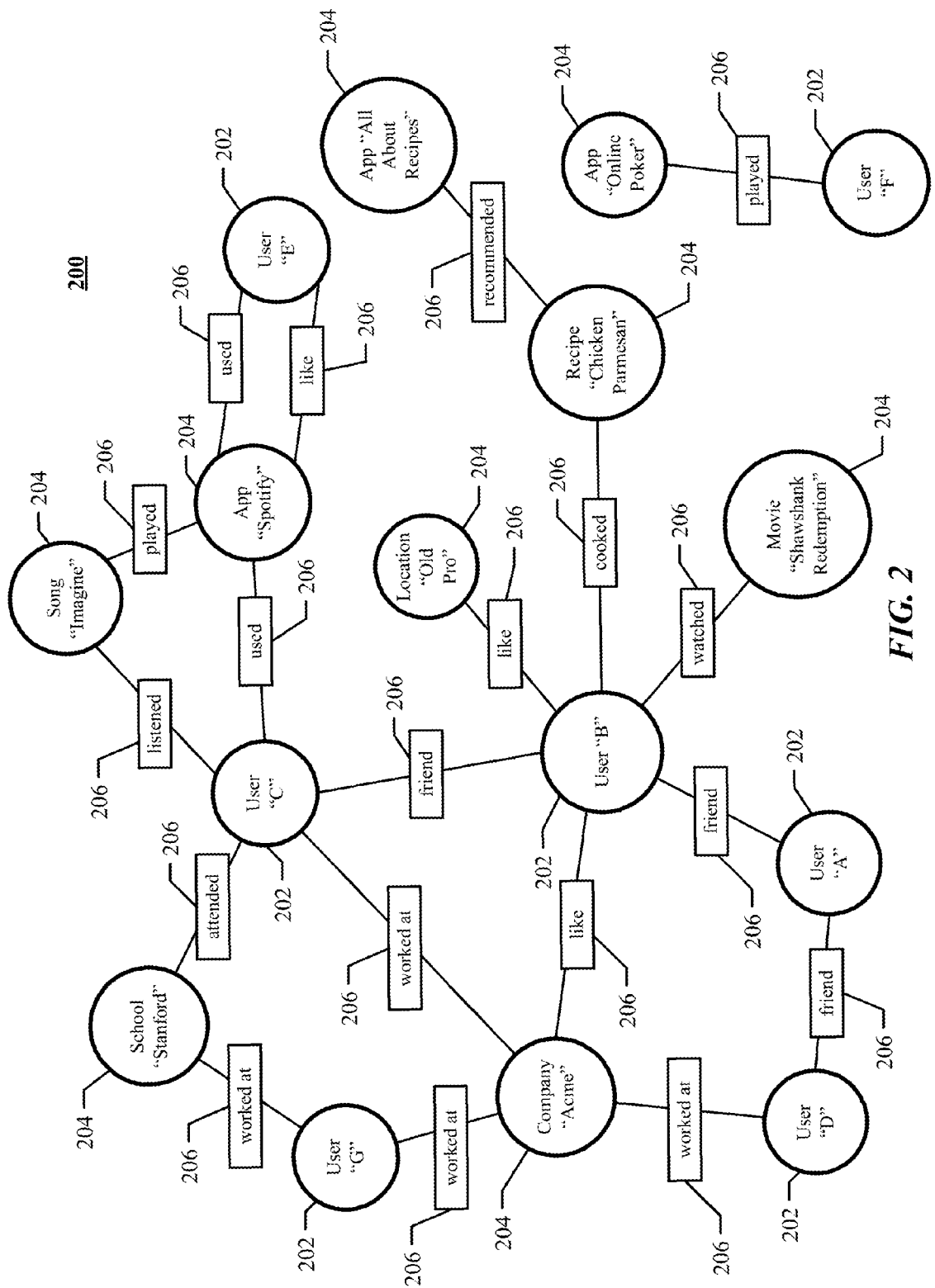
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more pages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more pages.

In particular embodiments, a node in social graph 200 may represent or be represented by a page (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP code) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Social-Based Web Crawling

Figure 3:
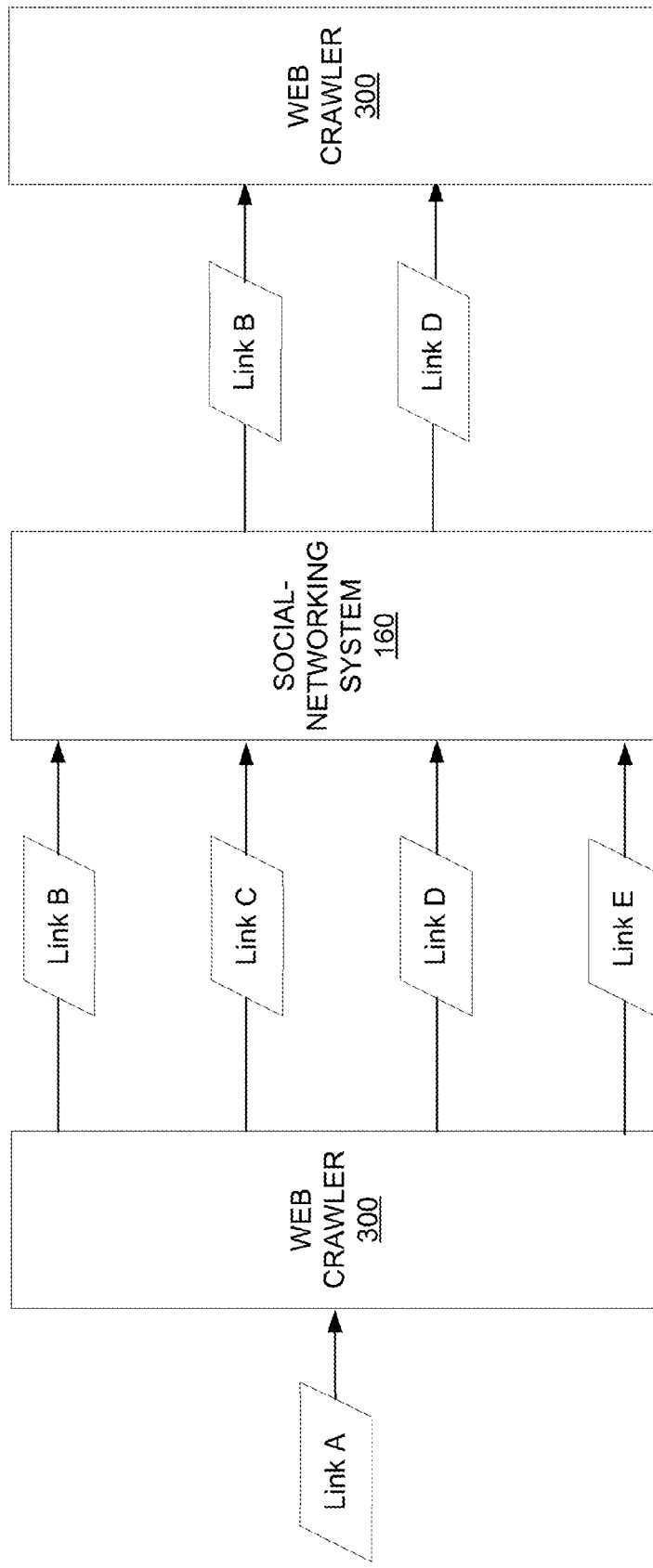
FIG. 3 illustrates an example web crawling.

FIG. 3 illustrates web crawling by web-crawler 300 and social-networking system 160. In particular embodiments, web-crawler 300 may be associated with a search engine of social-networking system 160. In particular embodiments, web-crawler 300 may crawl links corresponding to webpages respectively where each link to a webpage may be described by a uniformed resource locator (URL) of the webpage. Herein, reference to a link to a webpage may encompass an URL of the webpage, or vice-versa, where appropriate. In particular embodiments, web-crawler 300 may take as input links to one or more first webpages respectively. As an example and not by way of limitation, web-crawler 300 may receive Link A to webpage A for web crawling, where Link A may be shared by one or more users of social-networking system 160. In other words, a webpage shared by a user of the online social network may be used as a seed to begin crawling webpages (although any suitable method may be used for selecting seed webpages to being crawling). In particular embodiments, web-crawler 300 may identify links to one or more second webpages that are included within a first webpage as received for web crawling. As an example and not by way of limitation, web-crawler 300 may identify within webpage A, Links B-E corresponding to webpages B-E. Thereafter, Links B-E may be sent from web-crawler 300 to social-networking system 160 where social-networking system 160 may determine whether each of webpages B-E corresponding to Links B-E should be crawled. In particular embodiments, web-crawler 300 may crawl links to webpages of high-quality web domains. As an example and not by way of limitation, social-networking system 160 may determine that webpages B and D corresponding to Links B and D may be associated with one or more high-quality web domains. Thereafter, social-networking system 160 may send Links B and D to web-crawler 300 for further crawling. As such, web-crawler 300 may follow Links B and D for further web crawling. In particular embodiments, web-crawler 300 of the search engine may avoid crawling links to webpages of low-quality web domains. As an example and not by way of limitation, social-networking system 160 may determine that webpages C and E may be associated with one or more low-quality web domains. As such, social-networking system 160 may not send Links C and E to web-crawler 300 for further web crawling. In particular embodiments, even if webpage E were determined by social-networking 160 to be associated with a low-quality web domain, social-networking system 160 may still send Link E to web-crawler 300. However web-crawler 300 may not crawl any links within webpage E. As an example and not by way of limitation, web-crawler 300 may not send any links identified within webpage E to social-networking system 160. Although this disclosure discusses crawling webpages of the Internet, this disclosure contemplates crawling any suitable content objects of the Internet, the Deep Web, suitable intranets, or other suitable networks.

In particular embodiments, web-crawler 300 may index content of each webpage. As an example and not by way of limitation, web-crawler 300 may index content of webpages A, B, and D. In particular embodiments, web-crawler 300 may access content of each webpage for retrieval by the search engine to be presented in search results. As an example and not by way of limitation, web-crawler 300 may access content of webpages A, B, and D for retrieval by the search engine to be presented in search results. In particular embodiments, one or more of webpages A-E may include an internal webpage of social-networking system 160 and/or a webpage (for example, external webpage) operated by a third-party system 170 external to social-networking system 160. Although this disclosure describes and illustrates particular steps of FIG. 3 as occurring in a particular order, this disclosure contemplates any suitable steps of FIG. 3 occurring in any suitable order. Furthermore, although this disclosure describes and illustrates particular components, devices, and/or systems carrying out particular steps of FIG. 3, this disclosure contemplates any suitable combination of any suitable components, devices, and/or systems carrying out any suitable steps of FIG. 3.

In particular embodiments, a web domain may be a domain, a sub-domain, or a directory of a domain. As an example and not by way of limitation, a domain may be example.com. As another example and not by way of limitation, a sub-domain of example.com may be news.example.com. As yet another example and not by way of limitation, a directory of example.com may be example.com/news. In particular embodiments, the web domains of webpages A-E may include an internal web domain of social-networking system 160 and/or a web domain (i.e., external web domain) of a third-party system 170 external to social-networking system 160. As an example and not by way of limitation, an internal web domain of social-networking system 160 may be facebook.com or facebook.com/help. As another example and not by way of limitation, an external web domain may be cnn.com. In particular embodiments, a web domain of webpage A may be the same as one or more web domains of webpages B-E. In particular embodiments, a web domain of webpage A may be different from web domains of webpages B-E. Although the disclosure describes particular examples of web domains, this disclosure contemplates any suitable web domains in any suitable manner.

In particular embodiments, social-networking system 160 may determine whether a webpage should be crawled. As an example and not by way of limitation, social-networking system 160 may determine whether webpage B, C, D, and/or E should be crawled. As another example and not by way of limitation, social-networking system 160 may determine whether webpage B, C, D, and/or E should be sent to web-crawler 300. In particular embodiments, the determination by social-networking system 160 may be based at least on a web domain of the webpage. As an example and not by way of limitation, social-networking system 160 may access a domain ranking for each web domain where the domain ranking may be based at least on one or more domain-quality signals associated with the web domain. In particular embodiments, one or more of the domain-quality signals may be provided by social-networking system 160. In particular embodiments, one or more of the domain-quality signals may be provided by third-party system 170 external to social-networking system 160. In particular embodiments, the domain ranking may indicate a quality of the web domain. As such, a high-quality web domain has a domain ranking higher than that of a low-quality web domain. As an example and not by way of limitation, the high-quality web domain may have a domain ranking above a pre-determined threshold while the low-quality web domain may have a domain ranking below the pre-determined threshold. In particular embodiments, a high-quality web domain may include content that is at least interesting, reliable, trending, fresh, and/or appealing. As such, the domain rankings may distinguish such high-quality web domains whose contents are socially optimal for content retrieval as search results. Furthermore, the high-quality web domains may be prioritized for web crawling. In particular embodiments, web-crawler 300 may focus its time and resources on crawling through webpages of high-quality web domains. In contrast, web-crawler 300 may avoid crawling through webpages of low-quality web domains. As an example and not by way of limitation, high-quality web domains may include CNN.com and wikipedia.com. Accordingly, these high-quality web domains may include one or more interesting webpages for web crawling and indexing. As another example and not by way of limitation, low-quality web domains may include freeMD5.com. Accordingly, web-crawler 300 may avoid crawling through any webpage of freeMD5.com. In particular embodiments, social-networking system 160 may select one or more of webpages B-E to crawl based at least on the domain rankings of the web domains associated with webpages B-E. As an example and not by way of limitation, social-networking system 160 may send webpages B and D for web crawling by web-crawler 300 because the domain rankings of one or more web domains associated with webpages B and D are above a pre-determined threshold. In contrast, social-networking system 160 may not send webpages C and E for web crawling by web-crawler 300 because the domain rankings of one or more web domains associated with webpages C and E are below the pre-determined threshold.

In particular embodiments, social-networking system 160 may access a domain ranking for each web domain where the domain ranking may be based at least on one or more domain-quality signals associated with the web domain. In particular embodiments, social-networking system 160 may up-rank a web domain based at least on the domain-quality signals associated with the web domain. Herein, reference to up-ranking a web domain may encompass increasing a domain ranking of the web domain, or vice-versa, where appropriate. In particular embodiments, social-networking system 160 may down-rank a web domain based at least on the domain-quality signals associated with the web domain. Herein, reference to down-ranking a web domain may encompass decreasing a domain ranking of the web domain, or vice-versa, where appropriate. As an example and not by way of limitation, a search engine of social-networking system 160 may access a domain ranking for each web domain of webpages B-E where the domain ranking may be based at least on one or more domain-quality signals associated with the web domain. In particular embodiments, one or more of the domain-quality signals may be provided by social-networking system 160 and/or third-party system 170 external to social-networking system 160. As an example and not by way of limitation, a domain-quality signal of a web domain may be associated with a measure of activations of one or more social plug-ins of one or more webpages of the web domain. In particular embodiments, the web domain may be an external web domain operated by third-party system 170 external to social-networking system 160. In particular embodiments, a social plug-in of a webpage may be a comment dialog box, a like button, a share button, or any suitable combinations thereof within the webpage. In particular embodiments, the social plug-in may be provided by social-networking system 160. In particular embodiments, the social plug-in may be provided by a third-party system 170 that is an affiliate of social-networking system 160. In particular embodiments, the measure of activations of the social plug-ins may include a measure of usage of a social plug-in. As an example and not by way of limitation, the measure of usage of the social plug-in may correspond to a number of times the social plug-in is rendered together with the rest of the webpage by web browser 132. As another example and not by way of limitation, the measure of usage of the social plug-in may correspond to a number of times the social plug-in is rendered together with the rest of the webpage by client system 130. In particular embodiments, as the number of activations of social plug-ins of the web domain increases, the web domain may be up-ranked. In contrast, as the number of activations of social plug-ins of the web domain decreases, the web domain may be down-ranked. Although this disclosure describes particular examples of measuring particular activations of particular social plug-ins of particular web domain, a domain-quality signal may be associated with any suitable means to measure any suitable activations of any suitable social plug-ins of any suitable web domain.

In particular embodiments, a domain-quality signal of a web domain may be associated with a measure of impressions of one or more webpages of the web domain. The web domain may be an external web domain operated by third-party system 170 external to social-networking system 160. In particular embodiments, the measure of impressions of a webpage of the web domain may be retrieved via a social plug-in nested within the webpage, where the social plug-in may be associated with social-networking system 160. As an example and not by way of limitation, a like button may be rendered as a social plug-in next to a news article of the webpage, where the webpage may be displayed on web browser 132 of client system 130. A user of web browser 132 may indicate that the content of the webpage (for example, the news article) is interesting by clicking on the like button. Furthermore, the user may approve the content of the webpage by clicking on the like button. As such, by the user clicking on the like button, an impression may be registered of the webpage by social-networking system 160. By aggregating the number of times the like button is clicked when the webpage is rendered, a measure of impressions corresponding to the aggregated number of times the like button is clicked may be retrieved by social-networking system 160. Accordingly, as more users clicked on the like button, the number of impressions of the webpage increases. As another example and not by way of limitation, a comment dialog box may be rendered as a social plug-in next to a video clip included within the webpage, where the webpage may be displayed on web browser 132 of client system 130. A user of web browser 132 may comment on the video clip by typing texts within the comment dialog box. As such, by the user utilizing the comment dialog box, an impression may be registered of the webpage by social-networking system 160. By aggregating the number of times users commented on the video clip, a measure of impressions corresponding to the aggregated number of comments may be retrieved by social-networking system 160. As an example and not by way of limitation, as more users commented on the video clip, the number of impressions of the webpage increases. In particular embodiments, the domain-quality signal may be a measure of impressions as aggregated across one or more webpages of the web domain. As an example and not by way of limitation, the domain-quality signal may be a measure of impressions by summing the total number of impressions of all webpages of the web domain based on the social plug-ins of all the webpages of the web domain. In particular embodiments, as the number of impressions of one or more webpages of the web domain increases, the web domain may be up-ranked. In contrast, as the number of impressions of the webpages of the web domain decreases, the web domain may be down-ranked. Although this disclosure describes particular examples of measuring particular impressions of particular webpages based on particular social plug-ins, a domain-quality signal may be associated with any suitable means to measure any suitable impressions of any suitable webpages based on any suitable social plug-ins.

In particular embodiments, a domain-quality signal of a web domain may be associated with a measure of authoritativeness of the web domain. The web domain may be an external web domain operated by third-party system 170 external to social-networking system 160. In particular embodiments, a domain provider of the web domain may partner with social-networking system 160 to provide enriched and/or enhanced content for the web domain. In particular embodiments, in addition to the enriched and/or enhanced content being provided from the domain provider, the domain provider may provide pre-tagged information (for example, pre-tagged content) about particular characteristics of the web domain. In particular embodiments, the pre-tagged information may include characteristics associated with an author, a topic, and/or a sponsorship of the enriched content of the web domain. In particular embodiments, social-networking system 160 may regard the web domain as authoritative by increasing the measure of authoritativeness of the web domain. In particular embodiments, social-networking system 160 may determine the measure of authoritativeness of the web domain based at least on the pre-tagged information. As an example and not by way of limitation, a domain provider affiliated with social-networking system 160 may sponsor a content of a web domain. As such, the web domain may provide sponsorship information about the domain provider along with a webpage of the web domain as rendered. In particular embodiments, the affiliation of the domain provider with social-networking system 160 (based at least on the sponsorship information) may indicate to social-networking system 160 that the domain provider may be approved and trusted by social-networking system 160, Accordingly, social-networking system 160 may utilize such sponsorship information to indicate that the web domain is authoritative. In particular embodiments, a web domain may be indicated by social-networking system 160 as authoritative merely by an inclusion of pre-tagged information within the webpages of the web domain. In particular embodiments, as the measure of authoritativeness of the web domain increases, the web domain may be up-ranked. In contrast, as the measure of authoritativeness of the web domain decreases, the web domain may be down-ranked. Although this disclosure describes particular examples of measuring particular authoritativeness of particular web domains based on particular pre-tagged information of the web domains, a domain-quality signal may be associated with any suitable means to measure any suitable authoritativeness based on any suitable pre-tagged information of any suitable web domains.

In particular embodiments, a domain-quality signal of a web domain may be associated with a measure of engagement with a content of the web domain. The content of the web domain may be posted on social-networking system 160 and/or third-party system 170 external to social-networking system 160. In particular embodiments, a user (for example, a user of social-networking system 160) may engage the content of the web domain by performing one or more suitable actions associated with the content such as, for example, liking, posting a comment, and/or sharing a link of the content on social-networking system 160 and/or the third-party system 170. In particular embodiments, the content (for example, a movie) may correspond to a concept node 204, as discussed above. In particular embodiments, a number of users of social-networking system 160 interacting with the content posted on social-networking system 160 may indicated a measure of engagement with the posted content. As an example and not by way of limitation, as more users provide their feedback on the posted content, the measure of engagement with the posted content increases, and vice-versa, where appropriate. In particular embodiments, as the measure of engagement of the web domain increases, the web domain may be up-ranked. In contrast, as the measure of engagement of the web domain decreases, the web domain may be down-ranked. Although this disclosure describes particular examples of measuring particular engagement of particular web domains, a domain-quality signal may be associated with any suitable means to measure any suitable engagement of any suitable web domains. More information on tracking engagement with content of social-networking system 160 may be found in U.S. patent application Ser. No. 14/341,148, filed 25 Jul. 2014, which is incorporated by reference.

In particular embodiments, a domain-quality signal of a web domain may be associated with a measure of site-integrity of the web domain. An unreliable web domain may be associated with a low measure of site-integrity. As an example and not by way of limitation, web domains whose links frequently expire (for example, the number of 404 error messages that are returned for rendering one or more webpages of the web domain is greater than a pre-determined threshold) may be indicated as unreliable. Accordingly, the unreliable web domains may be associated with low measures of site-integrity. As another example and not by way of limitation, web domains associated with malware, spamming, and/or other undesirable content may be indicated as unreliable. As yet another example and not by way of limitation, web domains that are black-listed (or gray-listed) by social-networking system 160 and/or by third-party system 170 external to social-networking system 160 may be indicated as unreliable. In particular embodiments, as the measure of site-integrity of the web domain increases, the web domain may be up-ranked. In contrast, as the measure of site-integrity of the web domain decreases, the web domain may be down-ranked. Although this disclosure describes particular examples of measuring particular site-integrities of particular web domains, a domain-quality signal may be associated with any suitable means to measure any suitable site-integrities of any suitable web domains.

In particular embodiments, a domain-quality signal of a web domain may be associated with a measure of readability of the web domain. Furthermore, the measure of readability may be based on one or more languages utilized by one or more webpages of the web domain. Web domains whose webpages are rendered in a commonly-spoken language may be more readable, as compared to web domains whose webpages are rendered in a regional language. As an example and not by way of limitation, commonly-spoken languages may include Mandarin, Spanish, and English. As another example and not by way of limitation, regional languages may include Arabic, Russian, and Japanese. In particular embodiments, web domains whose webpages are rendered in a native language corresponding to a demographics of a user of the search engine may be more readable to the user, as compared to web domains whose webpages are rendered in a language that is not commonly used by the user. In particular embodiments, as the measure of readability of the web domain increases, the web domain may be up-ranked. In contrast, as the measure of readability of the web domain decreases, the web domain may be down-ranked. Although this disclosure describes particular examples of measuring particular readability of particular web domains, a domain-quality signal may be associated with any suitable means to measure any suitable readability of any suitable web domains.

In particular embodiments, a domain-quality signal of a web domain may be associated with a measure of an average fetch-time for one or more webpages of the web domain. Slower web domains whose average fetch-times are higher than a pre-determined threshold may not be interesting to users. Accordingly, the slower web domains may be down-ranked. In particular embodiments, web domains whose average fetch-times are higher than a pre-determined threshold (for example, 3 secs) may indicate to social-networking system 160 that the web domains may not be of good quality. As an example and not by way of limitation, high average fetch-times (for example, average fetch-times that are higher than a pre-determined threshold) of a web domain may indicate that hardware resources (for example, servers, memory, cache, and/or central processing units (CPUs)) that operate the web domain may be limited. As another example and not by way of limitation, high average fetch-times (for example, average fetch-times that are higher than a pre-determined threshold) of a web domain may indicate that the hardware resources may not be able to meet the operating requirements of the web domain. Accordingly, web domains that are not of good quality may be down-ranked. In particular embodiments, as the measure of average fetch-times of the web domain increases, the web domain may be down-ranked. In contrast, as the measure of average fetch-times of the web domain decreases, the web domain may be up-ranked. Although this disclosure describes particular examples of measuring particular average fetch-times of particular web domains, a domain-quality signal may be associated with any suitable means to measure any suitable average fetch-times of any suitable web domains. Moreover, although this disclosure describes particular pre-determined thresholds associated with particular average fetch-times of particular web domains, this disclosure contemplates any suitable pre-determined thresholds associated with any suitable average fetch-times of any suitable web domains in any suitable manners. In particular embodiments, a pre-determined threshold associated with an average fetch-time of a web domain may depend on a content type of the web domain. As an example and not by way of limitation, a web domain whose webpages are substantially made up of video clips may have a higher pre-determined threshold than a web domain whose webpages are substantially text-based.

In particular embodiments, a domain-quality signal of a web domain may be associated with a measure of content age for one or more webpages of the web domain. A search engine may crawl web domains that provide updated news-related content. As an example and not by way of limitation, the search engine may crawl web domains whose content age for one or more webpages of the web domain may be lower than a pre-determined threshold (for example, 6 months). In particular embodiments, an indication of a content age for a webpage may be retrieved from the webpage. As an example and not by way of limitation, referencing a webpage that includes one or more social plug-ins, a time at which a social plug-in of the webpage was first rendered may provide an estimated time when the webpage was produced. As such, based on the provided estimated time when the webpage was produced, social-networking system 160 may determine a content age of the webpage. As another example and not by way of limitation, the webpage may indicate a published time of the webpage within a content of the webpage. As another example and not by way of limitation, social-networking system 160 may sift through one or more URLs of the web domain to determine a data and/or time information for each webpage of the web domain. In particular embodiments, as the measure of content age for one or more webpages of the web domain increases, the web domain may be down-ranked. In contrast, as the measure of content age for the webpages of the web domain decreases, the web domain may be up-ranked. In particular embodiments, a web domain may provide "timeless" content. As an example and not by way of limitation, a web domain with "timeless" content may include one or more webpages whose content age are substantially high. In particular embodiments, a web domain with "timeless" content may be an internet encyclopedia. As an example and not by way of limitation, an internet encyclopedia may be wikipedia.com. In particular embodiments, a web domain with "timeless" content may provide popular general reference work. As an example and not by way of limitation, a web domain that provides popular general reference work may be howstuffworks.com. Accordingly, web domains that provide "timeless" content may not be down-ranked even though their content age are substantially high. Although this disclosure describes particular examples of measuring particular content age of particular web domains, a domain-quality signal may be associated with any suitable means to measure any suitable content age of any suitable web domains.

In particular embodiments, a domain-quality signal of a web domain may be associated with a measure of topic relevance of a content of the web domain. The measure of topic relevance may indicate, for example, a level of interest from general users toward the content of the web domain. As an example and not by way of limitation, the measure of topic relevance may be proportional to the level of interest from the general users toward the content of the web domain. In particular embodiments, the measure of topic relevance may indicate whether the content of the web domain is well-received by a user of the search engine. As an example and not by way of limitation, the measure of topic relevance may be proportional to a probability or likelihood that the content of the web domain may be well-received by the user of the search engine. In particular embodiments, the measure of topic relevance may indicate whether the content of the web domain is trending. As an example and not by way of limitation, the web domain may include one or more webpages that are associated with trending content. Accordingly, the measure of topic relevance may be proportional to a number of webpages of the web domain that include trending content. In particular embodiments, social-networking system 160 may analyze a content of each webpage of the web domain to determine a measure of topic relevance associated with the content of the webpage. As an example and not by way of limitation, social-networking system 160 may analyze one or more of a text and a comment as posted of the content within the webpage to determine a topic relevance for the content. As another example and not by way of limitation, social-networking system 160 may utilize one or more topic-based tags of the content to determine a particular topic relevance for the content. In particular embodiments, as the measure of topic relevance of the content of the web domain increases, the web domain may be up-ranked. In contrast, as the measure of topic relevance of the content of the web domain decreases, the web domain may be down-ranked. Although this disclosure describes particular examples of measuring particular topic relevance of particular content of particular web domains, a domain-quality signal may be associated with any suitable means to measure any suitable topic relevance of any suitable content of any suitable web domains.

In particular embodiments, a domain-quality signal of a web domain may be associated with a measure of public sharing of a content of the web domain compared to a measure of private sharing of the content of the web domain. Particular web domains may be associated with private user engagements as indicated by the measure of private sharing of the content of the web domains. As an example and not by way of limitation, private user engagements may include communications among users of social-networking system 160 via one or more private messages. As another example and not by way of limitation, the measure of private sharing may increase as more users engage the content privately. In particular embodiments, web domains that are associated with private user engagements may be down-ranked for including content that may not be shared with other users publicly. As an example and not by way of limitation, web domains whose content are substantially privately communicated may be down-ranked. In particular embodiments, particular web domains may be associated with public user engagements as indicated by the measure of public sharing of the content of the web domains. As an example and not by way of limitation, such web domains may include content that are engaged by users publicly (for example, users may share, like, post, and/or comment the content with other users via social-networking system 160). As another example and not by way of limitation, the measure of public sharing may increase as more users engage the content publicly. In particular embodiments, web domains that are associated with public user engagements may be up-ranked for including content that may be shared with other users publicly. In particular embodiments, the measures of private and public sharing of the content of the web domain may be determined by social-networking system 160. As an example and not by way of limitation, social-networking system 160 may continuously monitor users' actions corresponding to one or more webpages of the web domain on social-networking system 160. In particular embodiments, social-networking system 160 may examine whether links to the webpages of the web domains are shared via one or more newsfeeds or via private messages between users of social-networking system 160. In particular embodiments, as the measure of private sharing of the content of the web domain increases relative to the measure of public sharing of the content of the web domain, the web domain may be down-ranked. In contrast, as the measure of private sharing of the content of the web domain decreases relative to the measure of public sharing of the content of the web domain, the web domain may be up-ranked. Although this disclosure describes particular examples of measuring particular private sharing and particular public sharing of particular content of particular web domains, a domain-quality signal may be associated with any suitable means to measure any suitable combinations of any suitable private sharing and any suitable public sharing of any suitable content of any suitable web domains.

In particular embodiments, social-networking system 160 may determine a domain ranking for a web domain. As an example and not by way of limitation, social-networking system 160 may determine the domain ranking for the web domain based at least on one or more domain-quality signals associated with the web domain, as discussed above. In particular embodiments, social-networking system 160 may utilize a machine-learning (ML) algorithm to determine the domain ranking for the web domain. In particular embodiments, the ML algorithm may take as inputs one or more of the domain-quality signals of the web domain as provided by social-networking system 160. In particular embodiments, the ML algorithm may also take as input a historical ranking data associated with one or more previously-ranked web pages of the web domain. The previously-ranked web pages may be manually determined or determined by social-networking system 160. Although this disclosure describes particular examples of determining particular domain ranking for particular web domain based on particular domain-quality signals of the web domain, this disclosure contemplates any suitable examples of determining any suitable domain ranking for any suitable web domain based on any suitable domain-quality signals of the web domain.

FIG. 4A illustrates historical ranking data 400 for web crawling of FIG. 3. In particular embodiments, historical ranking data 400 may include page rankings corresponding to webpages, respectively. As an example and not by way of limitation, historical ranking data 400 may include Page_ranking$_{[1 \ldots N]}$ for Page_[1 . . . N] (i.e. webpages) respectively. In particular embodiments, the webpages may be associated with one or more web domains. In particular embodiments, the webpages may include webpages that have previously been ranked based on one or more domain-quality signals. As an example and not by way of limitation, one or more of the webpages may be manually ranked based on the domain-quality signals. As another example and not by way of limitation, one or more of the webpages may be ranked by social-networking system 160 based on a pre-determined algorithm taking as inputs values to the domain-quality signals. As yet another example and not by way of limitation, historical ranking data 400 may provide Page_ranking for each Page based on Signal_[1 . . . k]. Accordingly, a Page_ranking may be determined for each Page based at least on value(1 . . . k) corresponding to Signal_[1 . . . k] respectively. Furthermore, Page_ranking$_{[1 \ldots N]}$ may be determined for Page_[1 . . . N] based at least on value$_{[1 \ldots N]}$(1 . . . k) corresponding to Signal_[1 . . . k] of Page_[1 . . . N]. In particular embodiments, Signal_[1 . . . k] may correspond to the domain-quality signals for one or more web domains of Page_[1 . . . N], as discussed above. In particular embodiments, each Page_[1 . . . N] may be represented by an URL to the webpage. Although this disclosure describes and illustrates historical ranking data 400 for particular web crawling, this disclosure contemplates any suitable historical ranking data for any suitable web crawling in any suitable manner.

FIG. 4B illustrates domain ranking table 402 for web crawling of FIG. 3. In particular embodiments, domain ranking table 402 may be utilized by social-networking system 160 to determine a domain ranking for each web domain. In particular embodiments, each web domain may be ranked based at least on one or more domain-quality signals of the web domain. As an example and not by way of limitation, a Domain_ranking$_{[1 \ldots M]}$ may be determined for each Domain_[1 . . . M] (i.e. web domain) based on value(1 . . . k) corresponding to Signal_[1 . . . k] respectively. In particular embodiment, Signal_[1 . . . k] may correspond to one or more of the domain-quality signals for Domain_[1 . . . M]. Furthermore, Domain_ranking$_{[1 \ldots M]}$ may be provided for Domain_[1 . . . M] based on value$_{[1 \ldots M]}$(1 . . . k) corresponding to Signal_[1 . . . k] for Domain_[1 . . . M]. In particular embodiments, social-networking system 160 may utilize a ML algorithm to determine each Domain_ranking$_{[1 \ldots M]}$ where the ML algorithm takes as inputs one or more of value(1 . . . k) corresponding to Signal_[1 . . . k] for each Domain_[1 . . . M]. In particular embodiments, value$_{[1 \ldots M]}$(1 . . . k) may be provided by social-networking system 160. In particular embodiments, in addition to value$_{[1 \ldots M]}$(1 . . . k), social-networking system 160 may also consider historical ranking data 400 as an input to the ML algorithm. Accordingly, along with the domain-quality signals, the ML algorithm may consider one or more previously-ranked webpages of a web domain when determining a domain ranking for the web domain. As an example and not by way of limitation, referencing FIGS. 4A-B, in order to determine a Domain_ranking for each Domain_[1 . . . N], the ML algorithm may consider one or more Page_ranking[1 . . . N] corresponding to one or more Page_[1 . . . N] of the Domain_[1 . . . M] as an input. In particular embodiments, the scales associated with Page_ranking$_{[1 \ldots M]}$ and Domain_ranking$_{[1 \ldots M]}$ may be different. Although this disclosure describes and illustrates domain ranking table 402 for particular web crawling, this disclosure contemplates any suitable domain ranking table for any suitable web crawling in any suitable manner.

Figure 5:
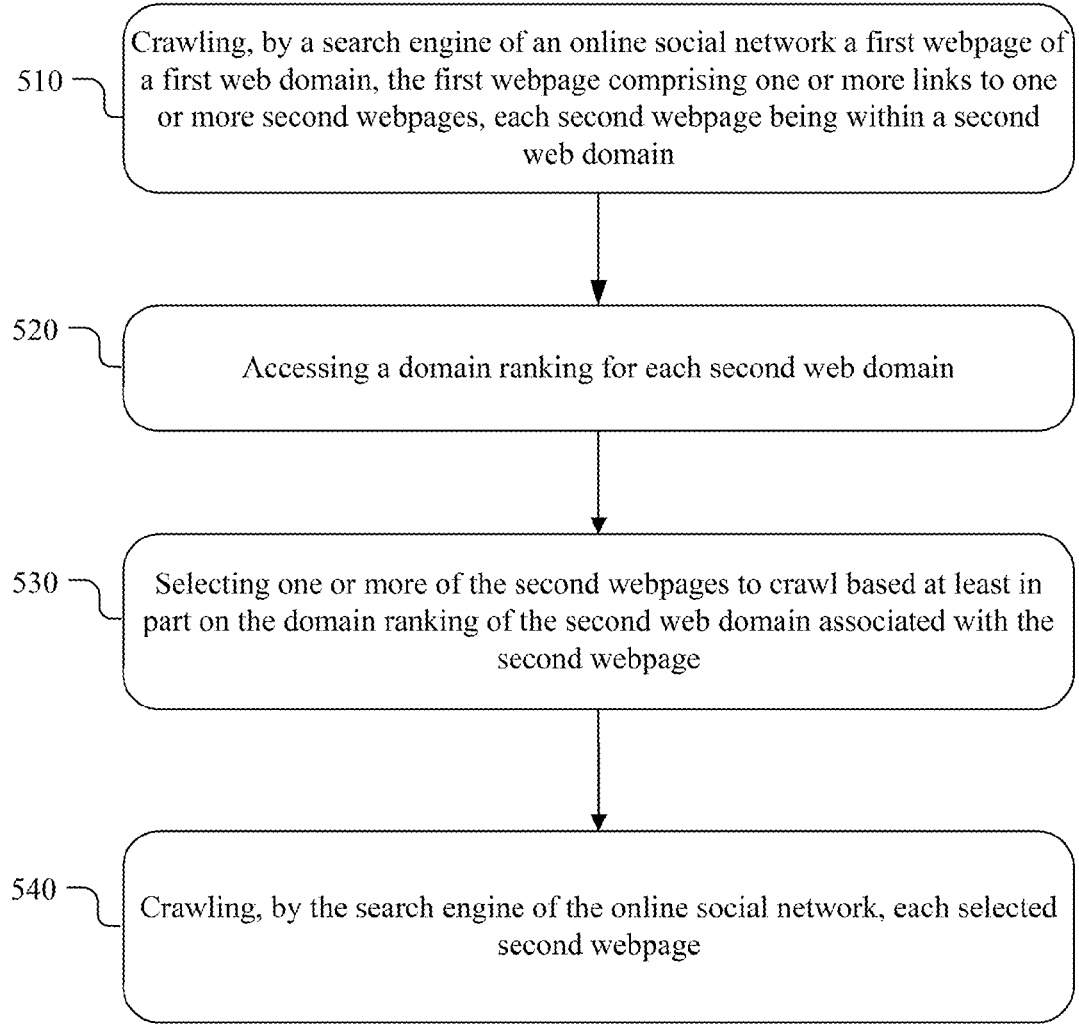
FIG. 5 illustrates an example method for web crawling.

FIG. 5 illustrates method 500 for web crawling. In particular embodiments, method 500 may be associated with social-networking system 160. As an example and not by way of limitation, method 500 may utilize data of social-networking system 160. As another example and not by way of limitation, method 500 may be operated by one or more servers 162 of social-networking system 160. In particular embodiments, the one or more servers 162 may include one or more web-crawlers 300. At step 510 of method 500, a search engine of an online social network may crawl a first webpage of a first web domain. Furthermore, the first webpage may include one or more links to one or more second webpages, where each second webpage may be within a second web domain. As an example and not by way of limitation, referencing FIG. 3, web-crawler 300 of the search engine may crawl Link A to webpage A. In particular embodiments, webpage A may be associated with the first web domain. Furthermore, webpage A may include Links B-E corresponding to webpages B-E (i.e. second webpages) respectively. In particular embodiments, webpages B-E may be associated with one or more second web domains different from the first web domain of webpage A. In particular embodiments, each of the second web domains of webpages B-E may be different. As another example and not by way of limitation, referencing FIG. 3, web-crawler 300 may send webpages B-E to social-networking system 160 where social-networking system 160 may determine whether each of webpages B-E should be crawled. At step 520 of method 500, a domain ranking may be accessed for each second web domain. In particular embodiments, for each second web domain, the domain ranking may be based at least on one or more domain-quality signals associated with the second web domain. In particular embodiments, at least one of the domain-quality signals may comprise a measure of activations of one or more social plug-ins of the online social network associated with one or more webpages of the second web domain. As an example and not by way of limitation, referencing FIG. 4B, social-networking system 160 may utilize domain ranking table 402 to access a domain ranking for each of the second web domain. Furthermore, Domain_ranking for each Domain_[1 . . . M] (i.e. second web domain) may be determined based on value(1 . . . k) corresponding to Signal_[1 . . . k] (i.e. domain-quality signals) of each Domain_[1 . . . M]. As yet another example and not by way of limitation, referencing FIG. 3, social-networking system 160 may access a domain ranking for each of the second web domains associated with webpages B-E. As another example and not by way of limitation, referencing FIG. 4B, one of Signal(1 . . . k) may correspond to a measure of activations of one or more social plug-ins of social-networking system 160 associated with one or more web pages of each Domain_[1 . . . M] (i.e. second web domains of webpages B-E), as discussed above. In particular embodiments, for each second web domain, the domain ranking may be based at least on a historical ranking data associated with the second web domain. As an example and not by way of limitation, referencing FIG. 4A, social-networking system 160 may access historical ranking data 400 to consider previously-ranked webpages (for example, Page_ranking$_{[1 \ldots N]}$ of Page_[1 . . . N]) of each second web domain as an input to a ML algorithm for determining the domain-ranking of the second web domain. At step 530 of method 500, one or more of the second webpages may be selected for crawling based at least in part on the domain rankings of the second web domains associated with the second webpages. As an example and not by way of limitation, referencing FIG. 3, social-networking system 160 may select one or more of webpages B-E for crawling based at least in part on the domain rankings of the second web domains associated with webpages B-E. As another example and not by way of limitation, referencing FIG. 3, the domain rankings of second web domains associated with webpages B and D may be higher than a pre-determined threshold. As such, webpages B and D may be associated with high-quality web domains, as discussed above. Accordingly, social-networking system 160 may select webpages B and D for further web crawling. As yet another example and not by way of limitation, referencing FIG. 3, the domain rankings of second web domains associated with webpages C and E may be lower than the pre-determined threshold. As such, webpages C and E may be associated with low-quality web domains, as discussed above. Accordingly, social-networking system 160 may not select webpages C and E for further web crawling. In particular embodiments, the order in which the second webpages are crawled may be determined by the domain rankings of the second web domains associated with the second webpages. As an example and not by way of limitation, webpage B may be associated with a higher domain ranking than webpage D. Accordingly, webpage B may be crawled before webpage D. At step 540 of method 500, the search engine may crawl each selected second webpage. As an example and not by way of limitation, referencing FIG. 3, social-networking system 160 may send to web-crawler 300 selected webpages B and D for further web crawling. In particular embodiments, the search engine of social-networking system 160 may send one or more of the web-crawlers 300 to one or more of the selected second webpages, where each web-crawler 300 receives at least one of the selected second webpages from the search engine for web crawling. As such, the web-crawlers 300 may substantially crawl the selected second webpages in parallel. In particular embodiments, each web-crawler 300 may prioritize the selected second webpages as received from the search engine for web crawling. As an example and not by way of limitation, referencing FIG. 3, social-networking system may include two web-crawlers 300A-B associated with two servers 162 respectively. The search engine may send webpages B and D, whose domain rankings are higher than the pre-determined threshold, to web-crawlers 300A-B for web crawling respectively. The search engine may also send webpages C and E, whose domain rankings are lower than the pre-determined threshold, to web-crawlers 300A-B for web crawling respectively. Thereafter, web-crawler 300A-B may prioritize crawling webpages B and D over webpages C and E. As an example and not by way of limitation, webpages B and D may be placed in highest priority slots (for example, top of queues) of servers 162 associated with web-crawlers 300A-B for web crawling. In particular embodiments, the search engine may index and access content of each selected second webpage for future retrieval in one or more search results of the search engine. Although this disclosure describes and illustrates particular steps of method 500 of FIG. 5 as occurring in a particular order, this disclosure contemplates any suitable steps of method 500 of FIG. 5 occurring in any suitable order. Moreover, although this disclosure describes and illustrates an example method for web crawling associated with an online social network including the particular steps of method 500 of FIG. 5, this disclosure contemplates any suitable method for web crawling associated with any suitable online social network including any suitable steps, which may include all, some, or none of the steps of method 500 of FIG. 5, where appropriate. Furthermore, although this disclosure describes and illustrates particular components, devices, or systems carrying out particular steps of method 500 of FIG. 5, this disclosure contemplates any suitable combination of any suitable components, devices, or systems carrying out any suitable steps of method 500 of FIG. 5.

Systems and Methods

Figure 6:
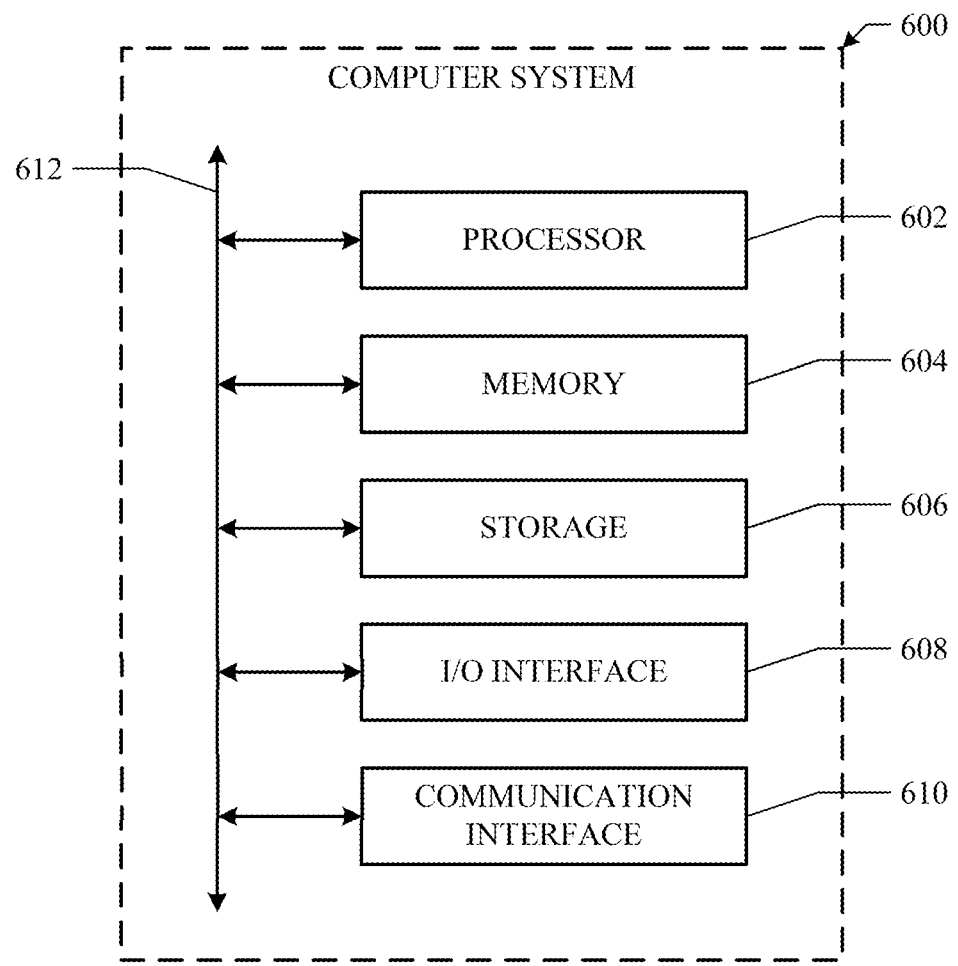
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    crawling, by a search engine of an online social network, a first webpage of a first web domain, the first webpage comprising one or more links to one or more second webpages, the one or more second webpages being within one or more second domains, wherein each web domain is external to the online social network;
    accessing a domain ranking for each second web domain, wherein for each second web domain the domain ranking is based on one or more domain-quality signals associated with the second web domain, and wherein at least one of the domain-quality signals comprises a measure of activations of one or more social plug-ins of the online social network available on one or more webpages of the second web domain, the social plug-in being an executable script providing an activable user-interface element for interacting with the online social network from the webpage of the second web domain;

selecting one or more of the second webpages to crawl based at least in part on the domain rankings of the second web domains associated with the second webpages; and crawling, by the search engine of the online social network, each selected second webpage.

2. The method of claim 1, further comprising:

accessing, by the search engine of the online social network, one or more domain-quality signals associated with each second web domain; and calculating a domain ranking for each second web domain based at least in part on the domain-quality signals associated with the second web domain.

3. The method of claim 1, wherein the domain ranking for each second web domain is calculated based at least in part by a machine-learning algorithm, the machine-learning algorithm taking as inputs the domain-quality signals associated with the second web domain and a historical ranking data of the second web domain.

4. The method of claim 3, wherein the historical ranking data for each second web domain comprises one or more user-determined rankings for one or more webpages of the second web domain.

5. The method of claim 1, wherein one or more of the second web domains is a sub-domain.

6. The method of claim 1, wherein crawling each selected second webpage comprises indexing each selected second webpage.

7. The method of claim 1, wherein crawling each selected second webpage comprises accessing content from each selected second webpage to be retrieved in one or more search results.

8. The method of claim 1, wherein the measure of activations of the one or more social plug-ins of the online social network comprises a measure of uses of the social plug-in to comment, like, or share content of the web domain.

9. The method of claim 1, wherein at least one of the domain-quality signals comprises a measure of impressions of one or more webpages of the second web domain by users of the online social network.

10. The method of claim 9, wherein the measure of impressions for each webpage of the second web domain is measured via a social plug-in of the online social network available on the webpage.

11. The method of claim 1, wherein at least one of the domain-quality signals comprises a measure of authoritativeness of the second web domain based on pre-tagged content provided by a domain provider of the second web domain.

12. The method of claim 1, wherein at least one of the domain-quality signals comprises a measure of engagement with content associated with the second web domain on the online social network.

13. The method of claim 1, wherein at least one of the domain-quality signals comprises a measure of site-integrity of the second web domain.

14. The method of claim 1, where at least one of the domain-quality signals is determined by one or more languages used on the webpages of the second web domain.

15. The method of claim 1, wherein at least one of the domain-quality signals comprises a measure of an average fetch-time for webpages of the second web domain.

16. The method of claim 1, wherein at least one of the domain-quality signals comprises a measure of content age for webpages of the second web domain.

17. The method of claim 1, wherein at least one of the domain-quality signals comprises a measure of topic relevance associated with a content of the second web domain.

18. The method of claim 1, wherein at least one of the domain-quality signals determines a level of public sharing of a content of the second web domain compared to a level of private sharing of the content of the second web domain.

19. One or more computer-readable non-transitory storage media embodying software that is operable when executed to:

crawl, by a search engine of an online social network, a first webpage of a first web domain, the first webpage comprising one or more links to one or more second webpages, the one or more second webpages being within one or more second domains, wherein each web domain is external to the online social network;

access a domain ranking for each second web domain, wherein for each second web domain the domain ranking is based on one or more domain-quality signals associated with the second web domain, and wherein at least one of the domain-quality signals comprises a measure of activations of one or more social plug-ins of the online social network available on one or more webpages of the second web domain, the social plug-in being an executable script providing an activable user-interface element for interacting with the online social network from the webpage of the second web domain;

select one or more of the second webpages to crawl based at least in part on the domain rankings of the second web domains associated with the second webpages; and crawl, by the search engine of the online social network, each selected second webpage.

20. A system comprising: one or more processors; and a memory coupled to the processors comprising instructions executable by the processors, the processors operable when executing the instructions to:

crawl, by a search engine of an online social network, a first webpage of a first web domain, the first webpage comprising one or more links to one or more second webpages, the one or more second webpages being within one or more second domains, wherein each web domain is external to the online social network;

access a domain ranking for each second web domain, wherein for each second web domain the domain ranking is based on one or more domain-quality signals associated with the second web domain, and wherein at least one of the domain-quality signals comprises a measure of activations of one or more social plug-ins of the online social network available on one or more webpages of the second web domain, the social plug-in being an executable script providing an activable user-interface element for interacting with the online social network from the webpage of the second web domain;

select one or more of the second webpages to crawl based at least in part on the domain rankings of the second web domains associated with the second webpages; and crawl, by the search engine of the online social network, each selected second webpage.

* * * * *